United States Patent
DeBerti et al.

(10) Patent No.: US 11,077,803 B2
(45) Date of Patent: *Aug. 3, 2021

(54) PICKUP TRUCK BASEMENT BOX

(71) Applicants: Doug DeBerti, Arroyo Grande, CA (US); Brad DeBerti, Arroyo Grande, CA (US)

(72) Inventors: Doug DeBerti, Arroyo Grande, CA (US); Brad DeBerti, Arroyo Grande, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/946,236

(22) Filed: Jun. 11, 2020

(65) Prior Publication Data

US 2020/0298764 A1 Sep. 24, 2020

Related U.S. Application Data

(63) Continuation-in-part of application No. 16/690,345, filed on Nov. 21, 2019, now Pat. No. 10,710,533.

(60) Provisional application No. 62/770,639, filed on Nov. 21, 2018.

(51) Int. Cl.
| | |
|---|---|
| *B60R 5/04* | (2006.01) |
| *B60R 19/48* | (2006.01) |
| *B60R 19/38* | (2006.01) |
| *B62D 43/04* | (2006.01) |

(52) U.S. Cl.
CPC .............. *B60R 5/041* (2013.01); *B60R 19/38* (2013.01); *B60R 19/48* (2013.01); *B62D 43/045* (2013.01)

(58) Field of Classification Search
CPC ......... B60R 5/041; B60R 19/38; B60R 19/48; B62D 43/04; B62D 43/045
USPC ................................... 296/26.09, 37.2, 37.6
See application file for complete search history.

(56) References Cited

U.S. PATENT DOCUMENTS

| | | | | |
|---|---|---|---|---|
| 3,210,117 A | * | 10/1965 | Hall ....................... | B62D 43/04 296/37.2 |
| 3,554,415 A | | 1/1971 | Woods | |
| 3,682,360 A | * | 8/1972 | Fletcher ................. | B60R 19/48 224/491 |
| 3,731,860 A | * | 5/1973 | Davis ..................... | B62D 43/10 224/42.23 |
| 4,312,620 A | * | 1/1982 | Muschalek, Jr. ...... | B62D 43/04 224/42.12 |
| 4,548,540 A | * | 10/1985 | Renfro ................. | B62D 43/045 206/304 |
| 4,676,415 A | * | 6/1987 | Kennedy ............... | B62D 43/04 224/42.21 |

(Continued)

FOREIGN PATENT DOCUMENTS

DE 20316591 U1 3/2004

*Primary Examiner* — Jason S Morrow
(74) *Attorney, Agent, or Firm* — McKee, Voorhees & Sease, PLC (57) ABSTRACT

A drawer assembly is provided for mounting beneath the bed of a truck and between the truck frame rails. The assembly includes a housing with an extendable and retractable drawer. The drawer may be mounted to the rear bumper of the truck so that the drawer and bumper move together between open and closed positions. Alternatively, the rear bumper, or portion thereof, may be moved out of the way of the drawer, which can then be opened and closed. The drawer can be opened manually, or alternatively, by remote control. The drawer assembly is hidden from view when closed and provides easy access for small objects when opened.

18 Claims, 13 Drawing Sheets

(56) References Cited

U.S. PATENT DOCUMENTS

| | | | | |
|---|---|---|---|---|
| 4,733,898 | A * | 3/1988 | Williams | B62D 33/02 224/404 |
| 4,915,437 | A * | 4/1990 | Cherry | B60R 11/06 108/44 |
| 5,135,274 | A * | 8/1992 | Dodd | B60R 11/06 224/491 |
| 6,328,366 | B1 * | 12/2001 | Foster | B60P 1/431 293/28 |
| 6,474,715 | B2 * | 11/2002 | Fukushima | B60R 5/04 296/37.1 |
| 6,561,489 | B1 * | 5/2003 | Wakefield | B62D 43/045 224/42.23 |
| 6,575,509 | B1 | 6/2003 | Golden | |
| 6,644,707 | B2 | 11/2003 | McLaughlin et al. | |
| 7,121,597 | B2 * | 10/2006 | Chuang | B60R 9/06 293/117 |
| 7,218,745 | B2 | 5/2007 | McConnell et al. | |
| 7,281,745 | B1 * | 10/2007 | Meinke | B60P 3/40 296/26.08 |
| 10,562,456 | B2 * | 2/2020 | Lynch | B60R 3/02 |
| 2001/0022450 | A1 * | 9/2001 | Delavalle | B62D 43/04 296/37.1 |
| 2005/0140159 | A1 * | 6/2005 | Barber | B60R 11/00 296/37.6 |
| 2010/0143085 | A1 * | 6/2010 | Tarabuso | B62D 43/045 414/463 |
| 2014/0044509 | A1 * | 2/2014 | Pino | B62D 43/045 414/463 |
| 2018/0072254 | A1 * | 3/2018 | Wymore | B60R 11/06 |
| 2019/0337457 | A1 * | 11/2019 | Garrett | B60R 9/06 |
| 2020/0001793 | A1 * | 1/2020 | Lynch | B60R 19/48 |

\* cited by examiner

PICKUP TRUCK BASEMENT BOX

CROSS-REFERENCE TO RELATED APPLICATIONS

This application is a Continuation-in-Part of U.S. application Ser. No. 16/690,345, filed Nov. 21, 2019, and claims priority to Provisional Application U.S. Ser. No. 62/770,693, filed on Nov. 21, 2018, which is herein incorporated by reference in its entirety.

FIELD OF THE INVENTION

The present invention is directed towards an enclosed storage compartment with an extendable/retractable drawer beneath the bed of a truck.

BACKGROUND OF THE INVENTION

Pick-up trucks provide ample cargo space in the bed of the truck, particularly for hauling large items and objects. In many trucks, the bed is open, without any cover, such that items in the bed are subject to weather exposure, as well as potential theft. Also, smaller items in the truck bed often slide around during driving and may require someone to climb into the bed to retrieve such items. Thus, there is a need for improved storage in a pick-up truck for small items.

Accordingly, a primary objective of the present invention is the provision of a storage compartment on a pick-up truck for small objects, with a compartment being moveable between an extended open position behind the truck tailgate and a retracted closed position beneath the truck bed.

Another objective of the present invention is the provision of a drawer assembly for pick-up truck which is enclosed and hidden from view when closed.

A further objective of the present invention is the provision of a drawer assembly for a pick-up truck which can be provided as original equipment or as an aftermarket retro-fit onto the truck.

Still another objective of the present invention is the provision of a storage box for a pick-up truck which mounts to the rails of the truck frame and to the rear bumper of the truck.

Yet another objective of the present invention is the provision of a storage box beneath the bed of a pickup truck wherein the rear bumper hides the storage box in a closed position and pivots to an open position to allow the storage box to be pulled rearwardly to an open position.

Another objective of the present invention is the provision of a pick-up truck basement storage box which slides or rolls between open and closed positions.

Still another objective of the present invention is the provision of a pick-up truck storage box beneath which the spare tire can be stored.

A further objective of the present invention is the provision of a drawer assembly beneath the bed of a pick-up truck which can be manually pulled and pushed between opened and closed positions, or alternatively, can be motorized for opening and closing with a switch in the truck cab or with a key fob.

Another objective of the present invention is the provision of a truck storage box which is economical to manufacture, and durable and safe in use.

These and other objectives will become apparent from the following description of the invention.

SUMMARY OF THE INVENTION

A storage box resides beneath the bed of a pickup truck and moves rearwardly and forwardly between open and closed positions. In one embodiment, the pull out drawer of the storage box is connected to the rear bumper, which an operator pulls or pushes between the open and closed positions. In an alternative embodiment, the rear bumper pivots or folds, in whole or in part, away from the drawer, which can then be pulled rearwardly beyond the rear bumper to the open position.

To install an aftermarket basement box the spare, trailer hitch (if present), and rear bumper are first removed. This allows the basement box to be installed as an after-market accessory. In alternative examples the basement box may be provided as an OEM accessory.

A drawer assembly is provided for a pickup truck to safely and securely hold small objects. The assembly includes a storage drawer or compartment extendable from and retractable into a box beneath the bed of a pickup truck. The protective box is typically made from steel, aluminum, or an equivalent material. The protective box may be made from suitably formed sheet material without reinforcement if the material is strong enough. Alternatively, reinforcing members or the like may be used to strengthen the protective box. The protective box encloses a cargo carrying bumper drawer and protects the contents from falling out and from the intrusion of dust, dirt, water and the like from damaging the cargo. The protective box is typically bolted to the frame, or equivalently to the bed, either directly or via auxiliary mounting hardware. The protective box is generally rectangular with an open rear end to accommodate the drawer which is coupled to the bumper.

The bumper drawer is slidably or rollably coupled to the protective box. The bumper drawer slides in and out of the protective box. The bumper drawer typically couples to the protective box via one or more drawer slides on the vertical sides of the protective box. Equivalently rollers or the like, with or without tracks may be mounted on the bottom or sides of the bumper drawer, or the bottom or sides of the protective box (either with or without tracks to guide the rollers). In further equivalent examples for light loads, the bumper drawer may simply lie in the protective box and be simply pulled out. The bumper drawer may be a box with a lid, a tray with sides, a simple platform or the like. The bumper drawer may form a single compartment or many compartments to segregate items stored therein. Alternatively, removable toolboxes and the like may be provided with mounting and latching mechanisms as accessories to prevent shifting during transit. In alternative examples, multiple trays may be provided to stack items like boards vertically.

The drawer has a shape matching the opening in the protective box, so that when the bumper drawer is closed, the basement box forms an enclosure to protect the contents inside.

Sealing may be provided by a close mechanical fit, gasketing or the like. Coupling of the bumper to the box end may be by direct attachment, or equivalently via a mounting bracket kit or the like.

When opening the bumper drawer, an end stop may be provided to keep the bumper drawer from being pulled too far out. In equivalent examples, a rack riding against a spring biased dog may be present to provide pull out to a desired distance (before the end stop is reached) and locking the bumper drawer in position until the dog is released to further extend the drawer or push it back in to a closed position.

To keep the bumper drawer in place during transit, and for security, a latch couples the bumper drawer to the truck frame or equivalently to the protective box. A release mechanism allows the typically latched bumper drawer to be extended. To close the bumper drawer, the drawer is slid back into the protective box until the latch engages. The latch is typically a post and double clamshell type mechanism similar to that found in a vehicle door latch. Alternatively, a single clamshell latch, or its equivalent may be used. Latches may be present in one or more locations, such as at both sides of the protective box, or just at one side. The latch may be manually actuated or actuated through the action of a solenoid coupled to its opening mechanism. The solenoid may be actuated through the accessory wiring via a button (momentary contact switch) typically mounted in the cab or other desired location. Alternatively, the solenoid may be remotely activated via a key fob, or the like, when the doors are unlocked, or when other suitable conditions are desired. It is envisioned that other equivalent latching mechanisms may be provided to keep the bumper drawer secured.

DETAILED DESCRIPTION OF THE PREFERRED EMBODIMENTS

The truck drawer assembly or storage box of the present invention is generally designated by the reference numeral 10 in the drawings. The drawer or box assembly 10 is designed for use on a pick-up truck 12, or other trucks having a bed 14, mounted on longitudinally extending frame rails 16. The truck may have a tailgate 18, though a tailgate is not required for the drawer or box assembly 10. The truck also has a rear bumper 20. The truck bed 14, frame rails 16, tailgate 18, and rear bumper 20 are conventional.

Figure 11:
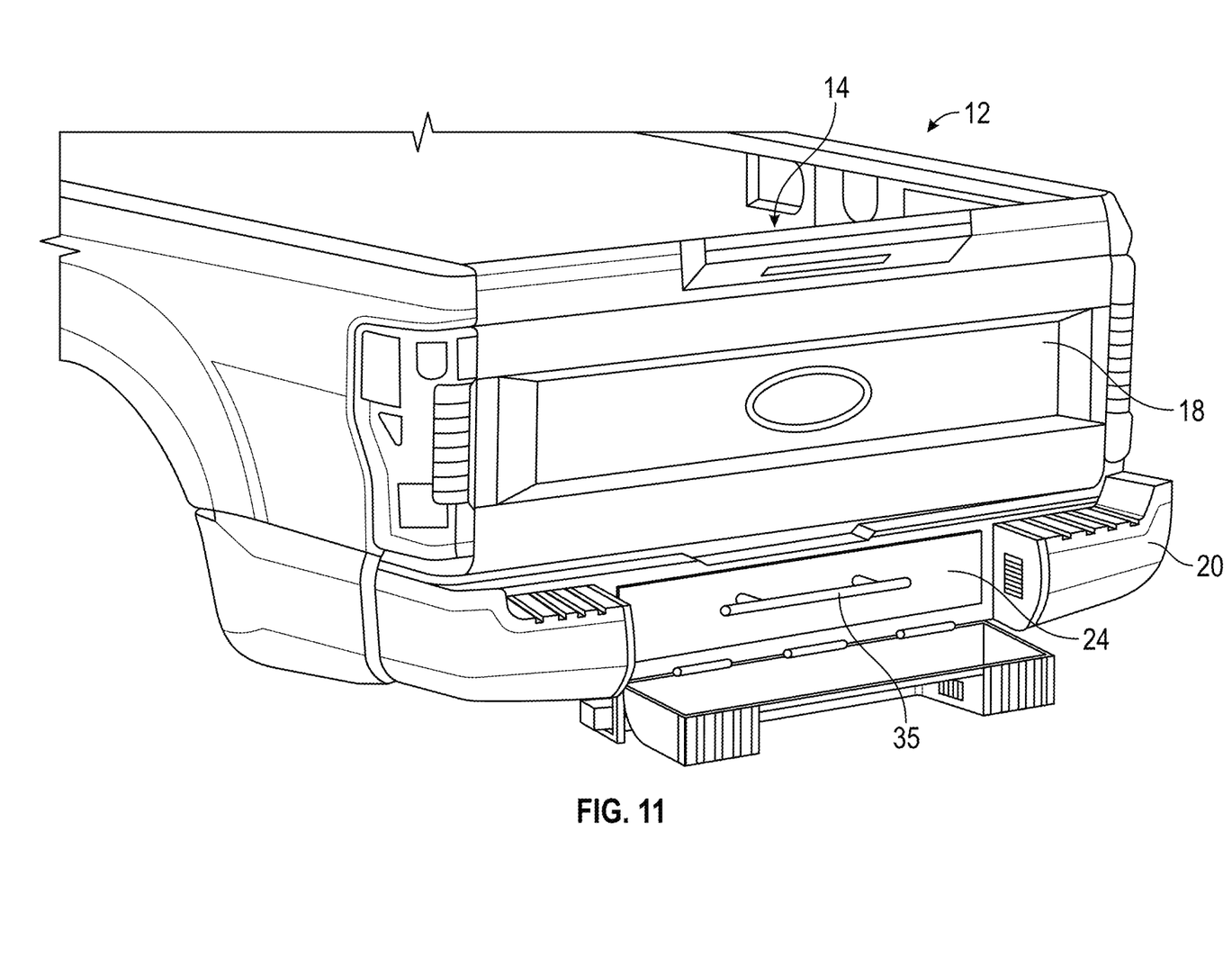
FIG. 11 is a perspective view of the second embodiment with a portion of the rear bumper folded downwardly to an open position.
Figure 12:
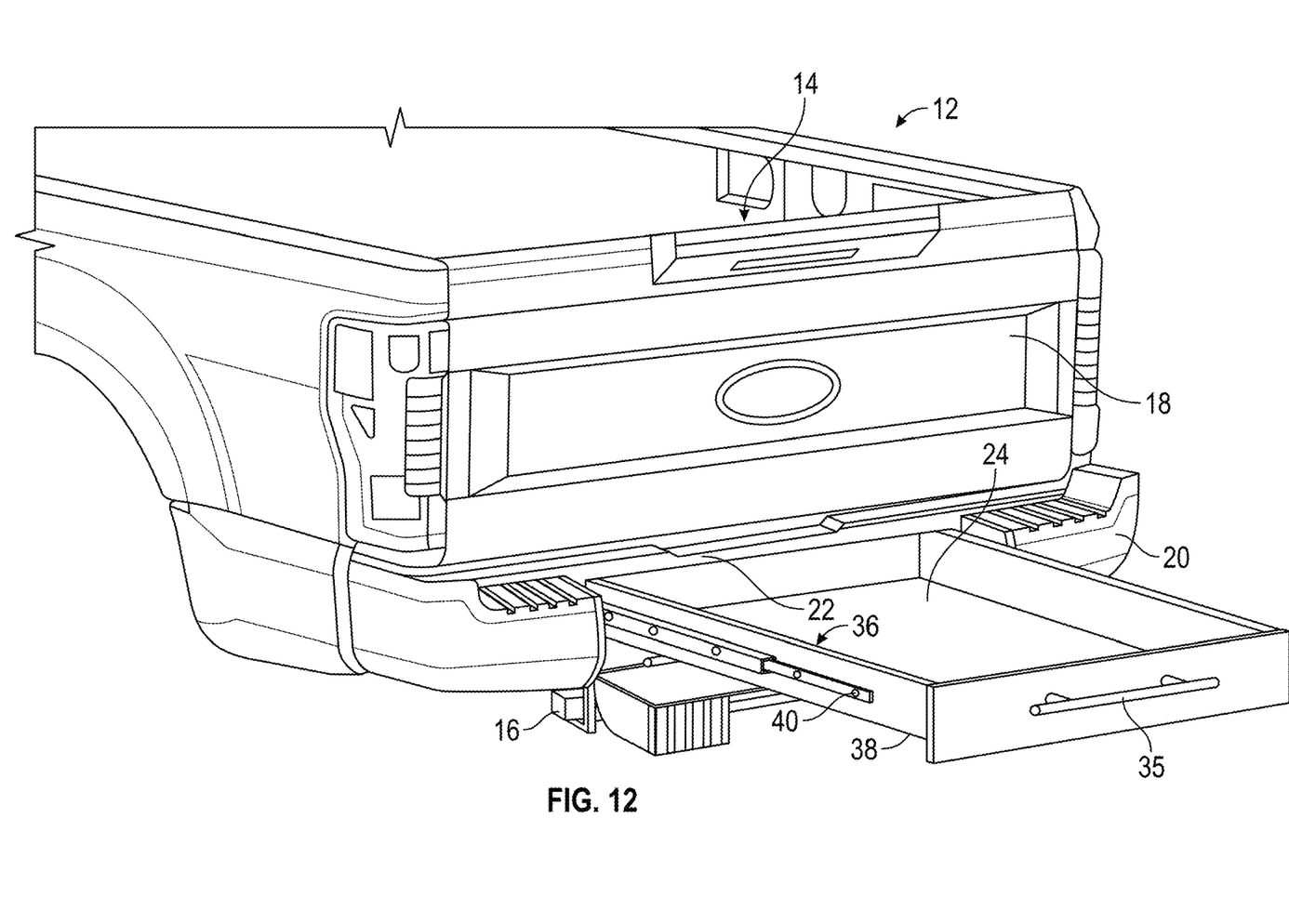
FIG. 12 is perspective view of the second embodiment with the drawer pulled rearwardly to an open position.
Figure 13:
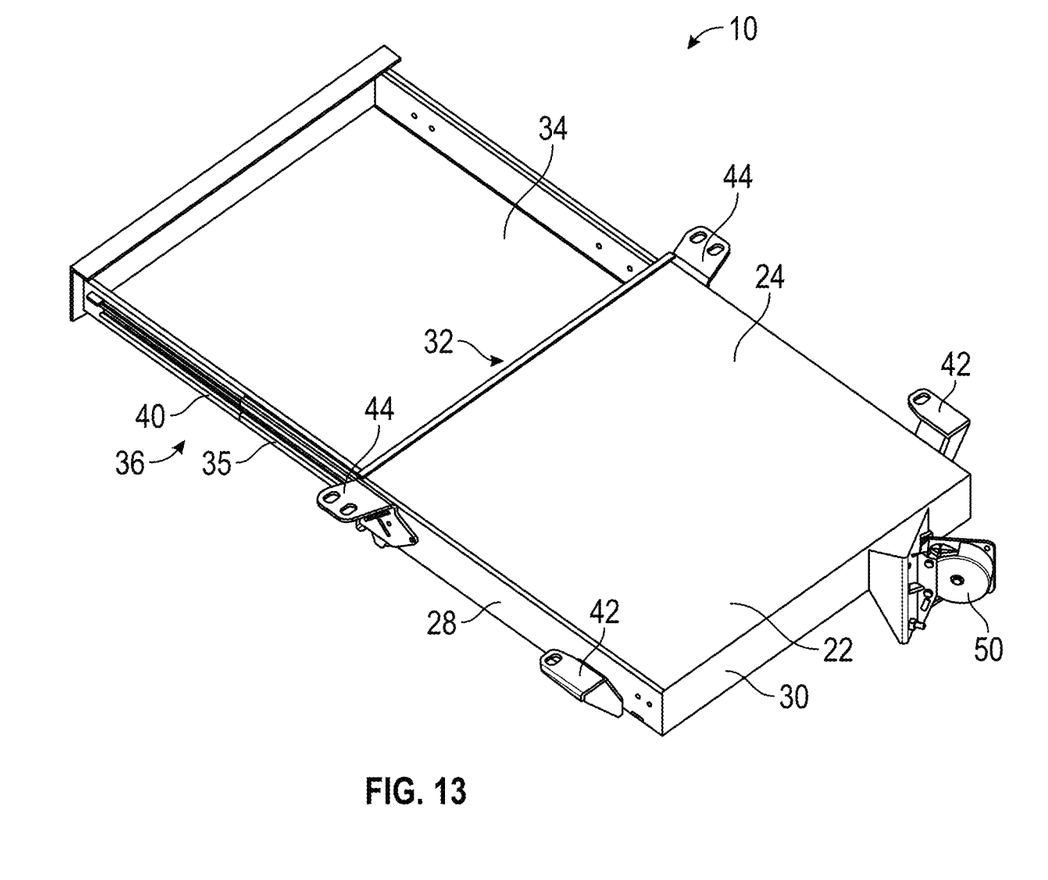
FIG. 13 is a perspective view of the second embodiment of the drawer assembly of the present invention in the open position.

The drawer assembly 10 is mounted to the frame rails 16 of the truck beneath the bed 14. More particularly, the assembly 10 includes a housing or box 22 having a top 24, a bottom 26, opposite sides 28, a front end 30, and a rear end 32. The walls of the top 24, the bottom 26, the sides 28, and the front end 30 form an enclosure with the rear end 32 being open. A storage drawer or compartment 34 is sized to fit within the housing 22 and can be moved between a retracted closed position (FIGS. 1, 10, and 11) and an extended open position (FIG. 2 and FIG. 12). The housing 22 and the drawer 34 are coupled with the male/female track system 36 on each of the opposite sides. For example, the housing 22 may have guide tracks 38 which slidably or rollably support guide rails 40 on the opposite sides of the drawer 34.

The housing 22 includes forward mounting brackets or plates 42 and rearward mounting brackets or plates 44 on the opposite sides 28 of the housing. In the preferred embodiment, the forward brackets 42 mount to the bottom of the truck frame rails 16, and the rearward mounting brackets 44 mount to the tops of the truck frame rails 16. The brackets 42, 44 can be bolted, welded, or otherwise secured to the frame rails 16.

FIGS. 1-9 show a first embodiment of the drawer assembly 10, and FIGS. 10-13 show a second embodiment of the drawer assembly plan. The housing 22, and its mounting to the truck frame or bed is preferably the same in both the first and second embodiments. Also, the mounting of the drawer 34 to the housing 22 is preferably the same in both the first and second embodiments.

In the first embodiment, the drawer 34 is connected to the rear bumper 20 to move together between the opening closed positions. The rearward end of the drawer 34 has opposite side brackets or plates 46 which are bolted or otherwise attached to the bumper 20. Preferably, the bumper brackets 46 receive the conventional bolts 48 which are normally used to mount the bumper 20 to the truck 12.

Figure 10:
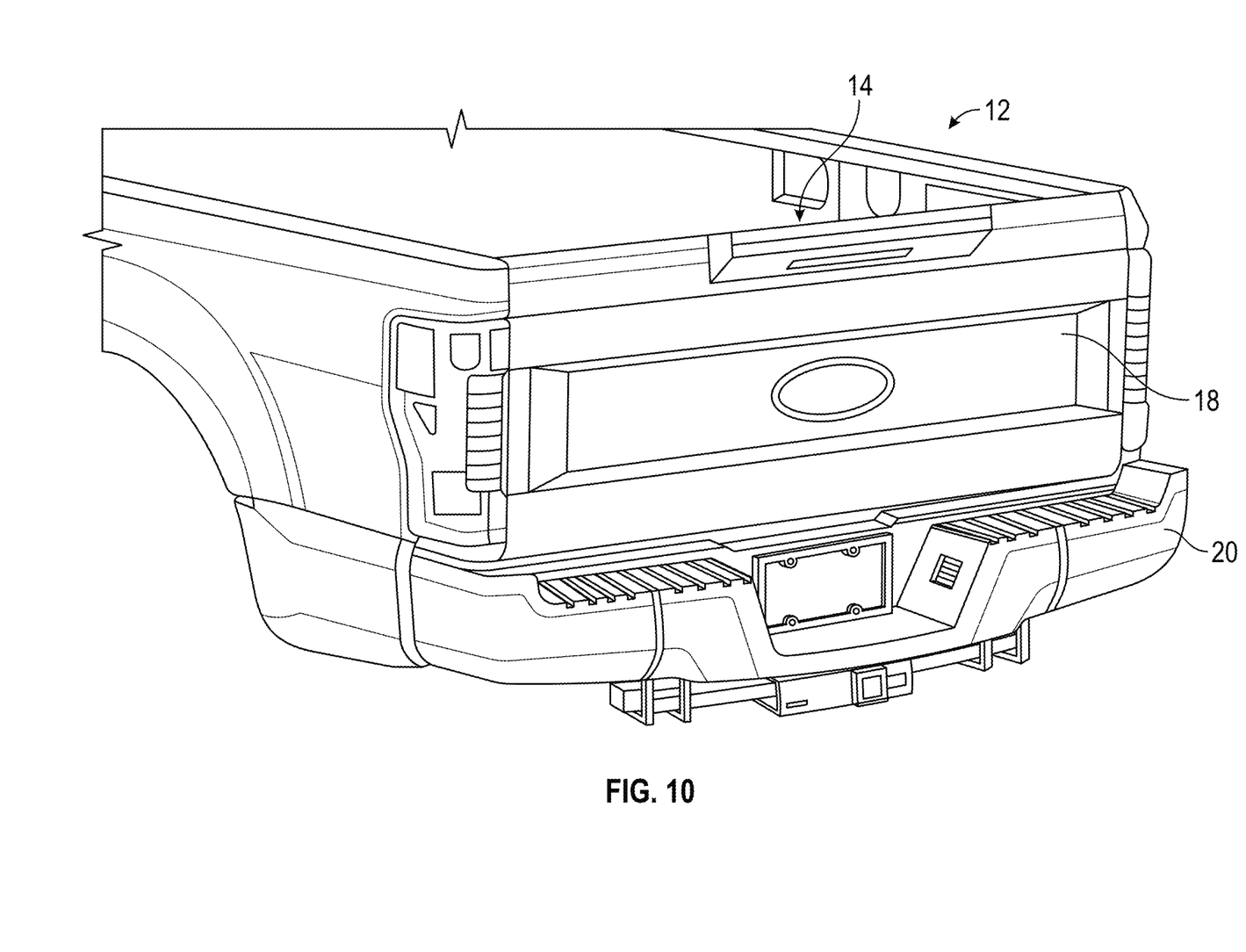
FIG. 10 is a perspective view of a second embodiment of the drawer assembly of the present invention with the drawer and rear bumper in closed positions.

In the second embodiment, the drawer 34 is disconnected from the rear bumper 20. In this second embodiment, the brackets 46 are eliminated. As seen in FIGS. 10-12, a central portion of the rear bumper 20 pivots out of the path of the drawer 34 so that the drawer can be open and closed. For example, the central portion of the bumper may pivot downwardly about a horizontal axis between a closed position hiding the drawer 34 (FIG. 10) to an open position (FIG. 11) providing access to the drawer handle 35 so that the drawer 34 can be pulled open or pushed closed. As an alternative to the central portion of the bumper pivoting downwardly, the central portion can pivot in other directions away from the drawer 34, such as upwardly or laterally about a vertical axis. As a further alternative, the full bumper can be pivoted for access to the drawer 34. A latch may be provided on the bumper 20 to retain the bumper in the closed position. Also, the handle 35 of the drawer 34 may take various shapes, including a recess handle or a pivotal handle.

The drawer assembly 10 also utilizes the conventional spare tire hardware for mounting a spare tire (not shown) to the bottom of the assembly. For example, a spare tire winch 50 is mounted to the front end 30 of the drawer assembly 10. A conventional winch cable 52 extends from the winch 50 and around or over a pulley or roller 54 mounted on the bottom 26 of the housing 22. The free end of the cable 52 extends downwardly from the pulley 54 and terminates in a bar or other mechanism to support the spare tire. The winch 50 can be actuated to raise and lower the cable, thereby raising and lowering the spare tire, as is known in the art.

Figure 1:
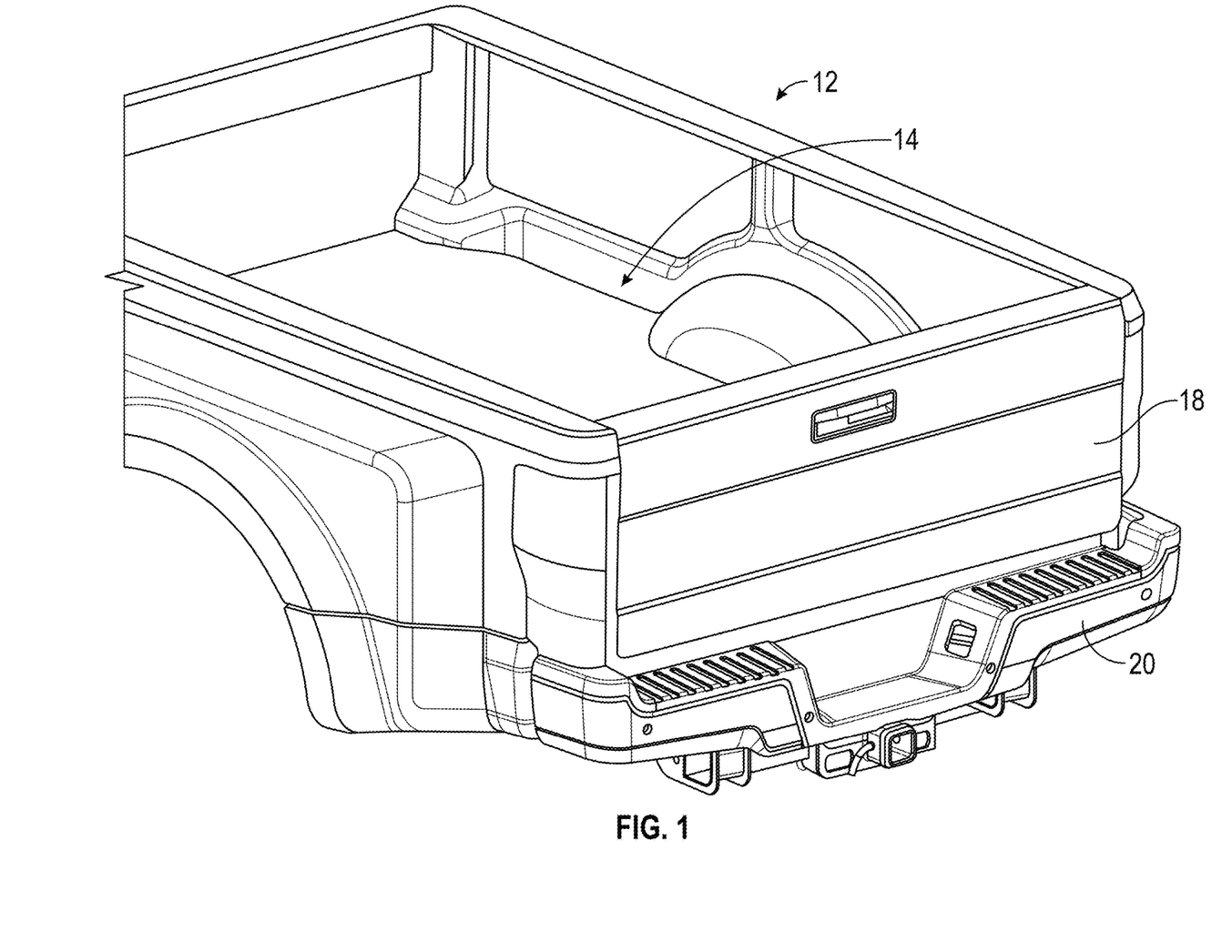
FIG. 1 is a perspective view of a pick-up truck bed and tailgate, with a first embodiment of the drawer assembly of the present invention in a closed position.
Figure 2:
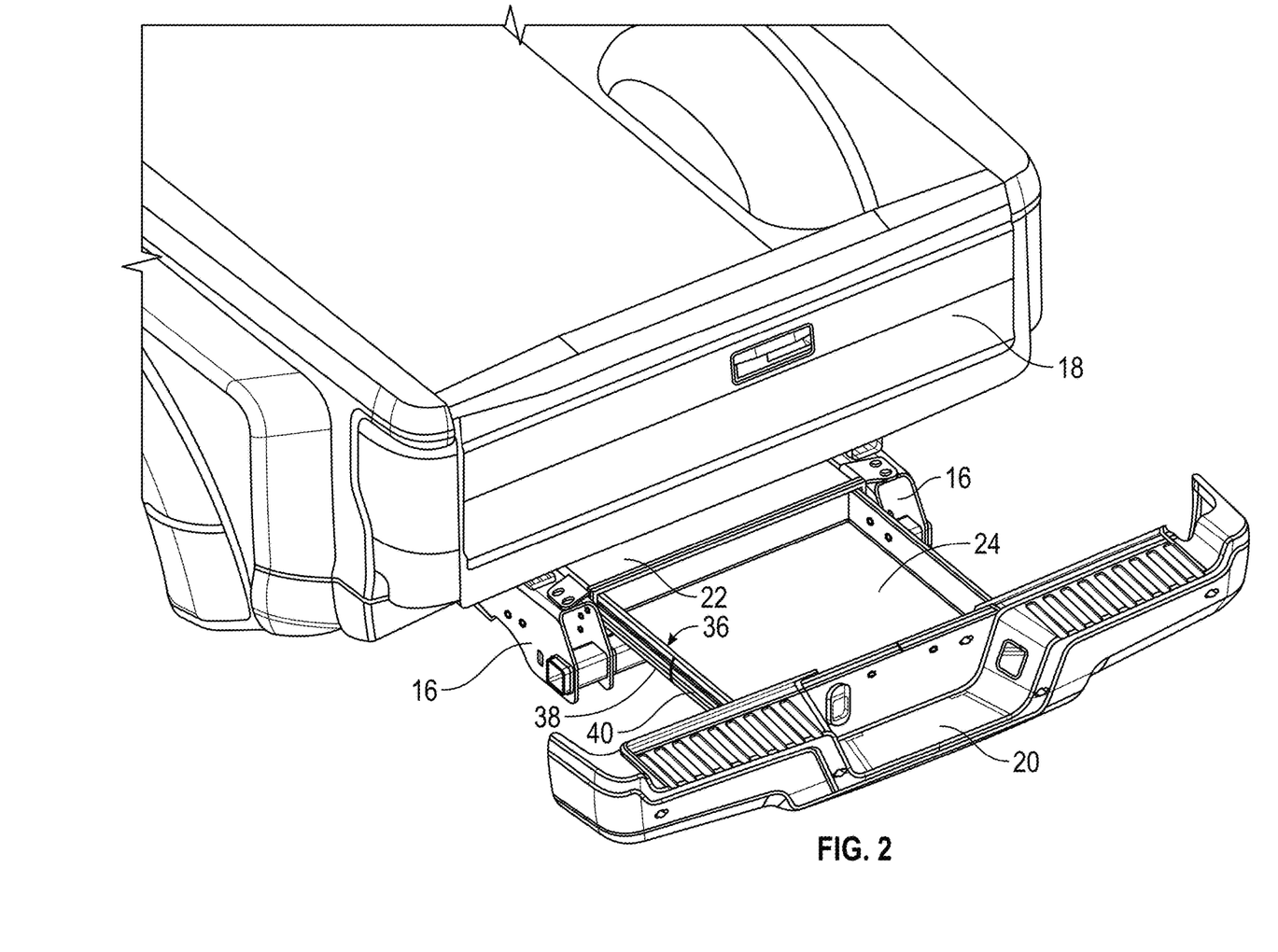
FIG. 2 is a perspective view like FIG. 1 showing the drawer assembly in an opened position.
Figure 3:
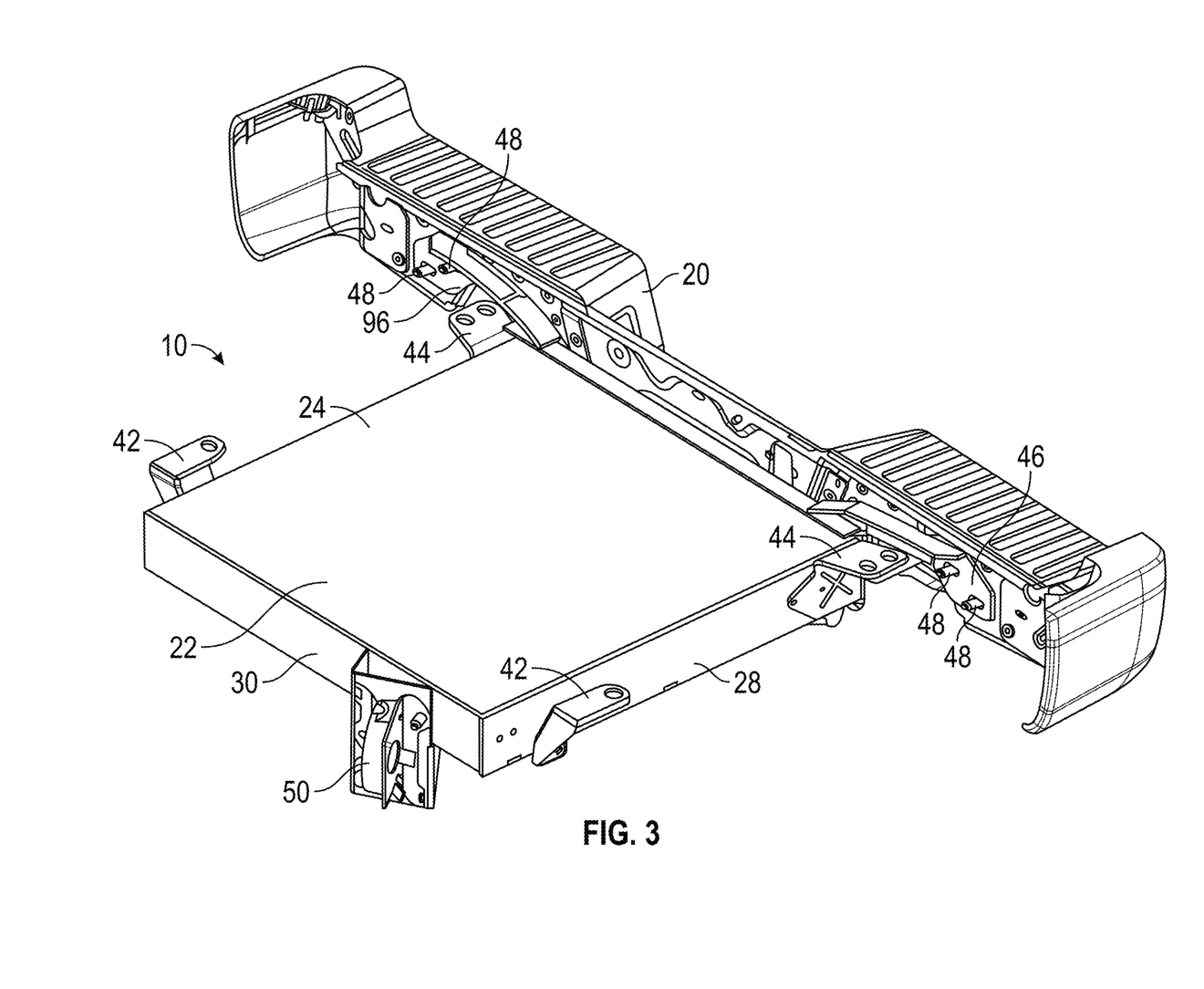
FIG. 3 is a perspective view of a first embodiment of the drawer assembly of the present invention mounted to the rear bumper and in a closed position.
Figure 4:
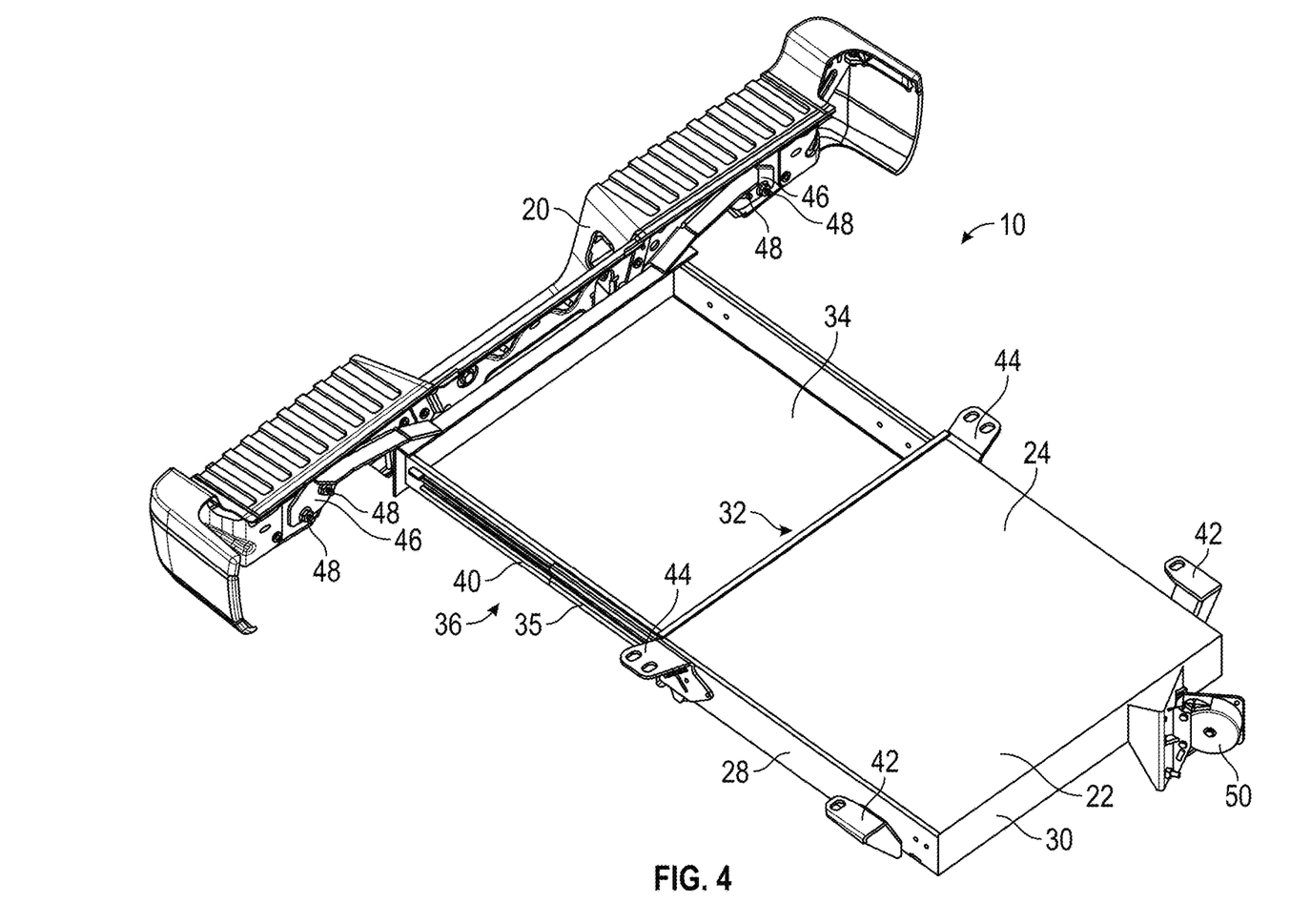
FIG. 4 is another perspective view of a first embodiment of the drawer assembly mounted to the bumper and in the open position.
Figure 5:
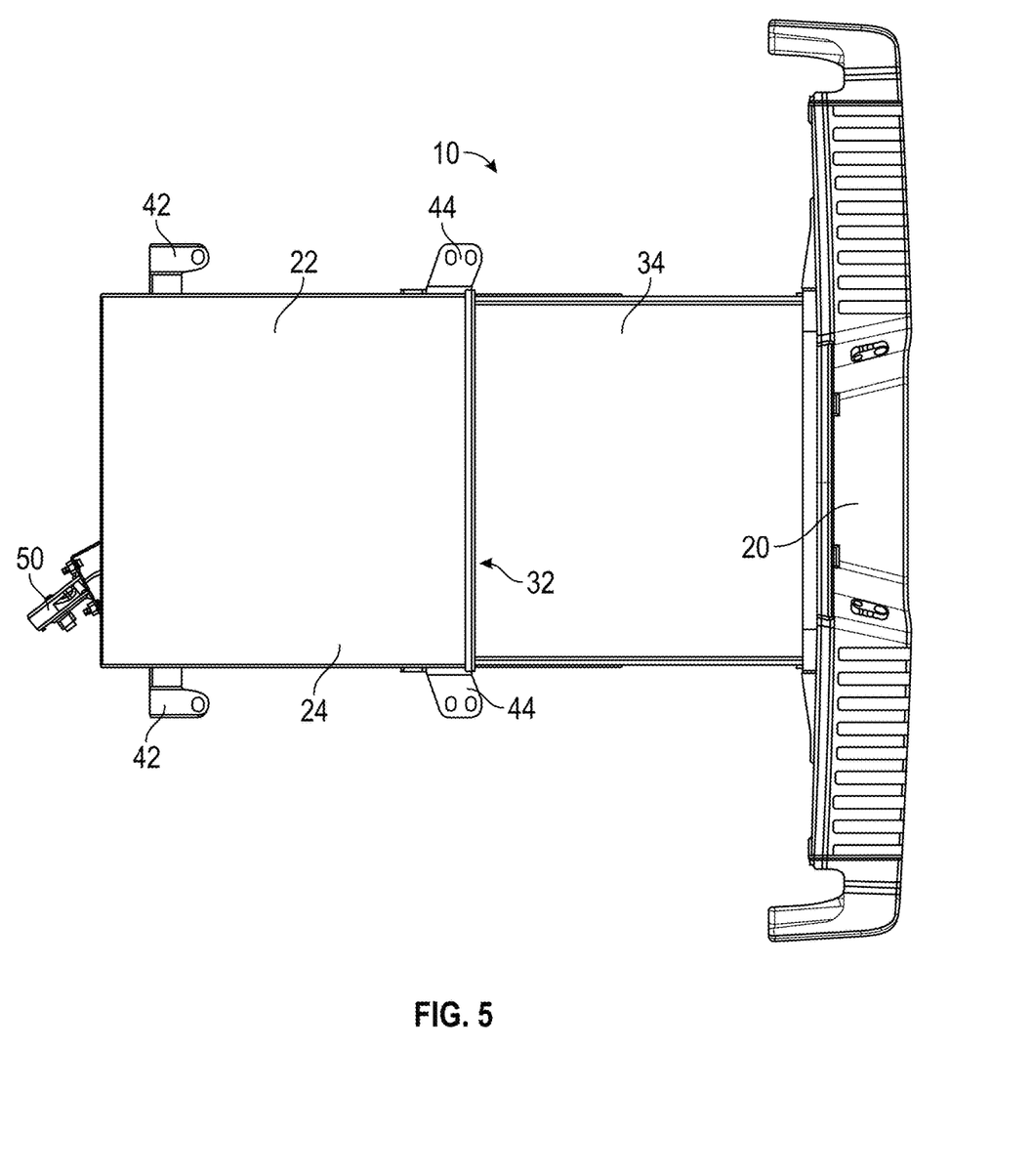
FIG. 5 is a top plan view of a first embodiment of the drawer assembly in an open position.
Figure 6:
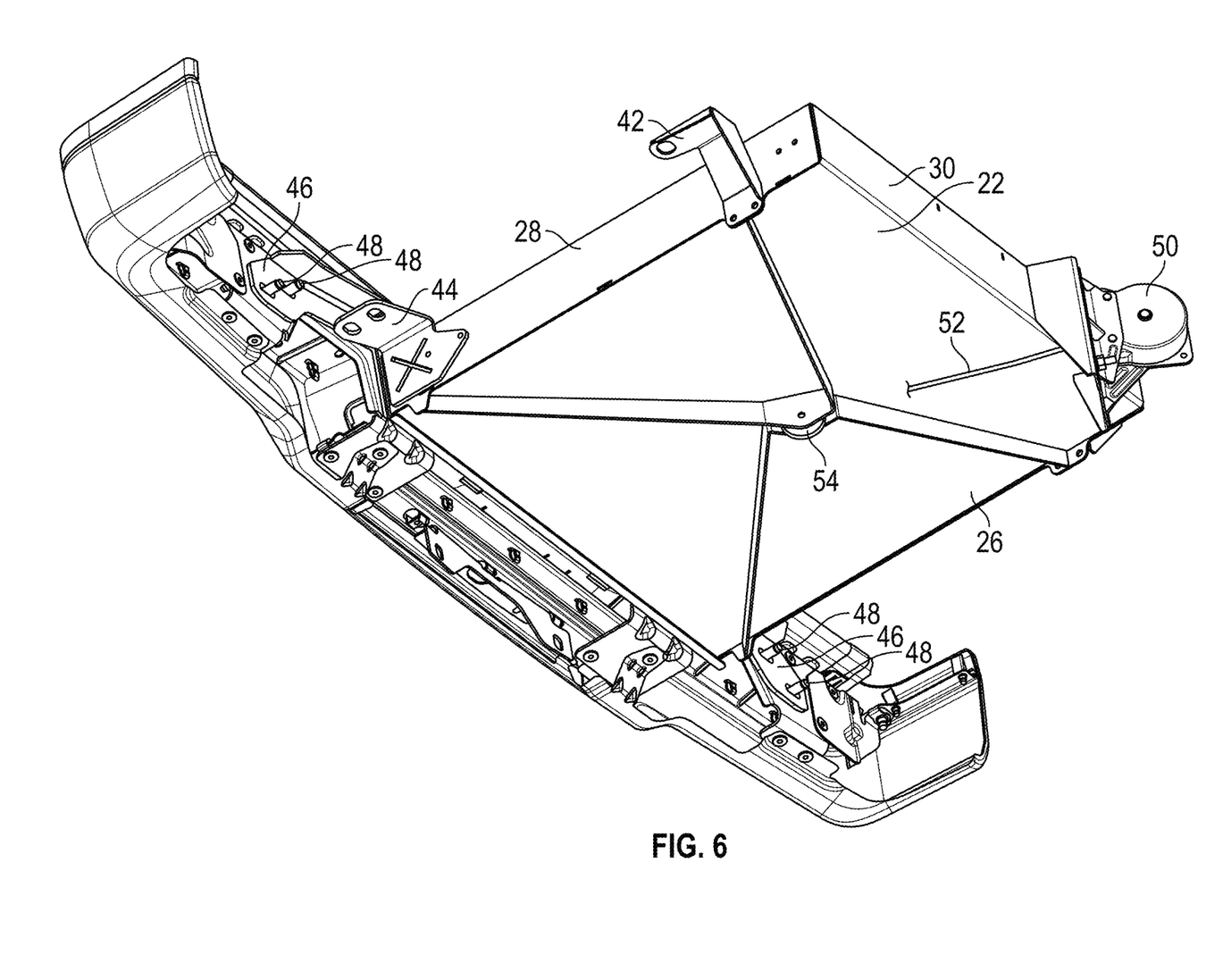
FIG. 6 is bottom perspective view of a first embodiment of the drawer assembly mounted to the rear bumper, and in a closed position.
Figure 7:
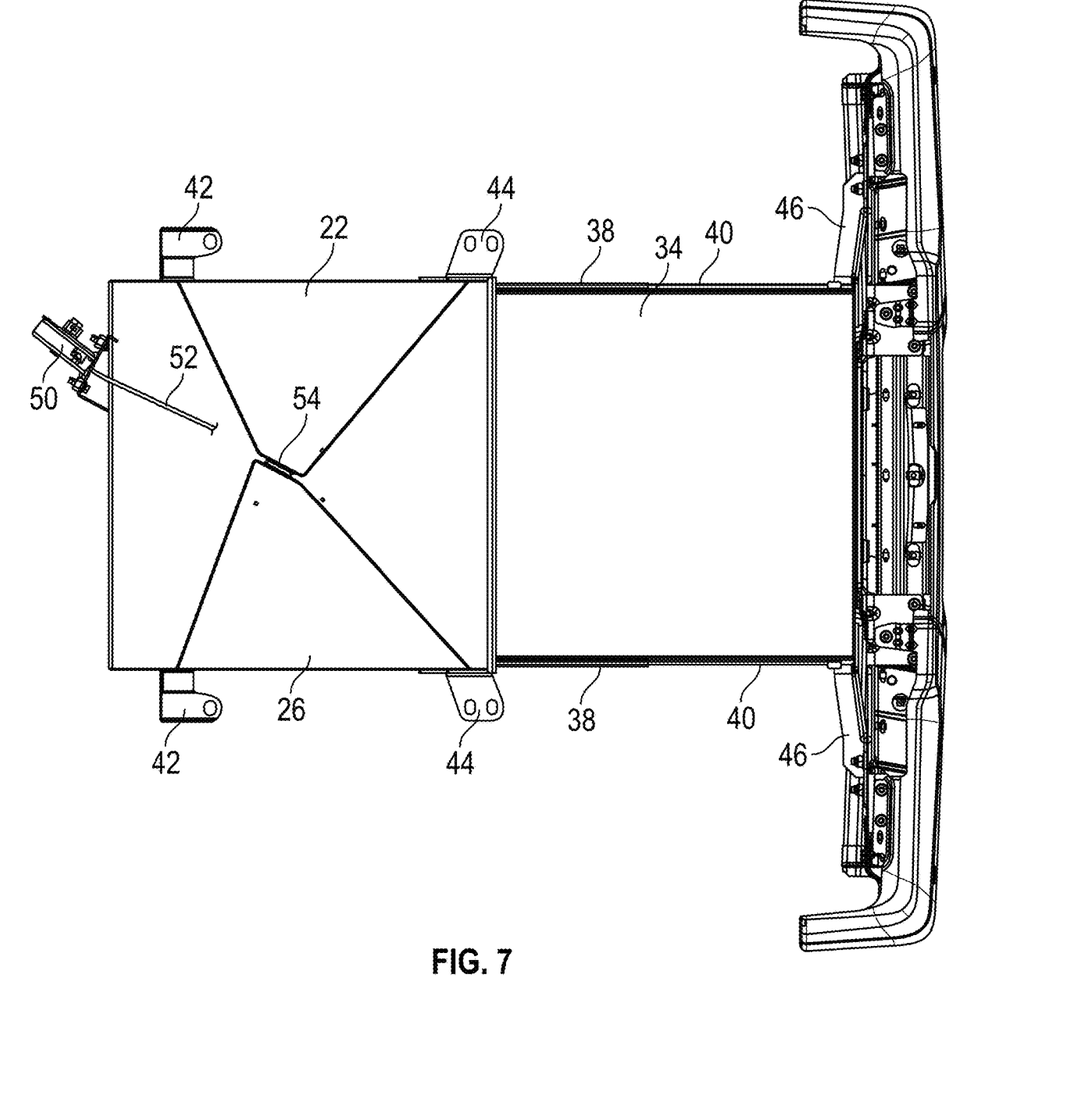
FIG. 7 is a bottom plan view of a first embodiment of the drawer assembly mounted to the rear bumper, and in an open position.
Figure 8:
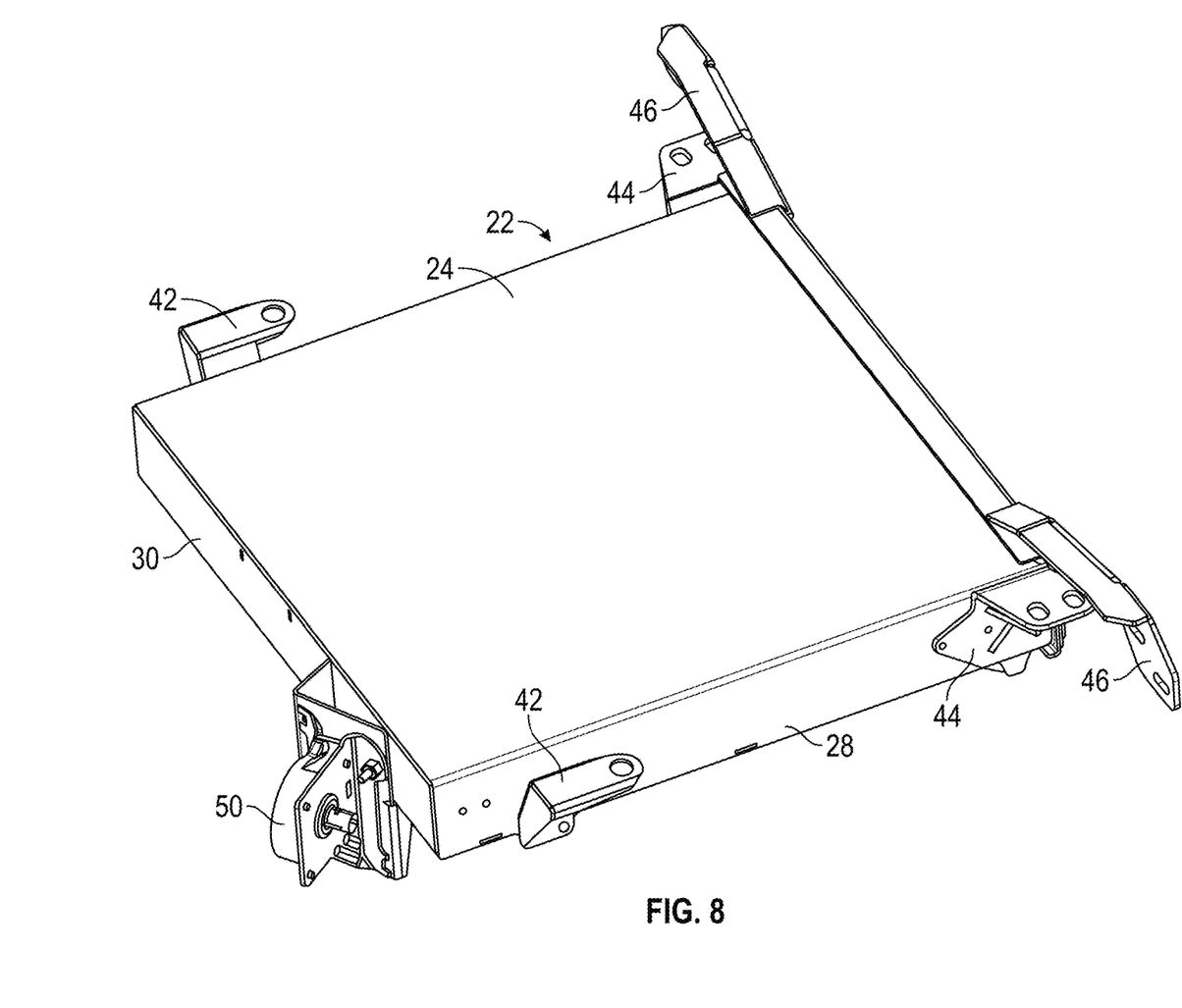
FIG. 8 is an upper perspective view of a first embodiment of the drawer assembly in a closed position.
Figure 9:
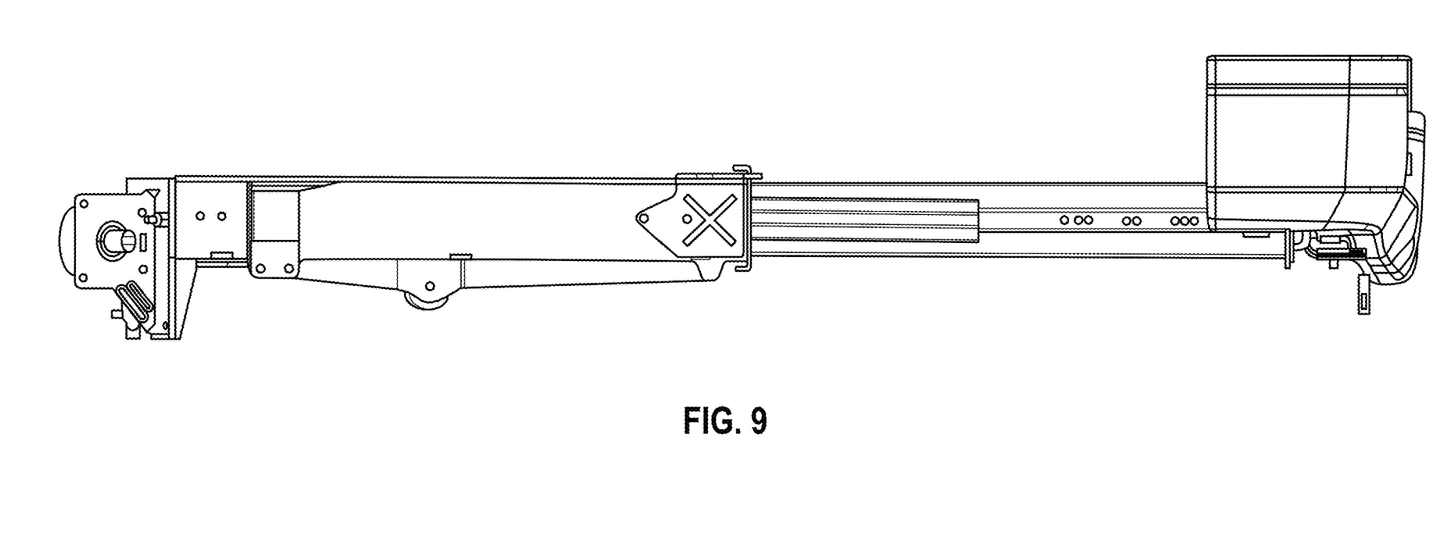
FIG. 9 is a side elevation view of a first embodiment of the drawer assembly attached to the rear bumper and in an open position.

In the first embodiment, the drawer or compartment 34 can be withdrawn from the housing 22 by pulling on the bumper 20 to the open position shown in FIG. 2, and can be moved to the closed position inside the housing 22 by pushing on the bumper 20, as shown in FIG. 1. In the second embodiment, the bumper 20 is moved from the closed position (FIG. 10) to the open position (FIG. 11), and then the drawer 34 can be pulled out of the housing 22 to its open position (FIG. 12). In both embodiments, the bumper 20 and/or the drawer or compartment 34 can be motorized or have a linear actuator which can be controlled by a switch in the truck cab or by a key fob for opening and closing the drawer 34. Also, a latch (not shown) may be provided on the drawer 34 to prevent accidental opening of the drawer. A lock may also be provided on the drawer assembly 10 to prevent access to the contents of the drawer 34.

The drawer 34 may also include dividing walls to form smaller compartments. When the drawer assembly 10 is closed, the contents are protected from the weather, and are hidden from view beneath the truck bed. When the drawer assembly is opened, a person can access the compartment 34 from behind the bumper 20 or from either side between the bumper and the tailgate 18.

The drawer assembly 10 fits between the existing frame rails 16 of the truck 12 and uses the factory bumper 20. The drawer assembly may have various dimensions. Also, weather stripping or seals maybe be provided on the housing 22 and/or the drawer 34 to prevent moisture from entering the drawer. By positioning the assembly 10 beneath the bed and between the rails 16, a "basement" storage compartment provides additional storage for smaller objects, either as an OEM or aftermarket component for the truck 12. The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A drawer assembly for a pick-up truck having laterally spaced frame members, a bed mounted on the frame members, and a rear bumper, the drawer assembly comprising:
   a box having a closed top, a closed bottom, closed opposite sides, a closed forward end, and an open rearward end, the box being mountable to the truck beneath the bed and between the frame members;
   a drawer slidably mounted for longitudinal movement into and out of the box through the open rear end of the box;
   brackets on the sides of the box for mounting to the truck frame members such that the box extends below the truck frame members; and
   whereby the drawer moves rearwardly to open and moves forwardly to close;
   the rear bumper pivoting away from the drawer about an axis located at a lower edge of the bumper to allow the drawer to be pulled rearwardly to open.

2. The drawer assembly of claim 1 wherein the box includes opposite side tracks and the drawer includes opposite side rails for mating with the tracks.

3. The drawer assembly of claim 1 further comprising rollers on the tracks or on the rails.

4. The drawer assembly of claim 1 wherein the box brackets extend laterally outwardly to engage the frame members.

5. The drawer assembly of claim 1 further comprising a spare tire support system on the box to removably mount a spare tire below the box.

6. The drawer assembly of claim 5 wherein the spare tire support system includes a winch on the box.

7. A drawer assembly for a truck having longitudinal frame members, a bed on top of the frame members, and a rear bumper, the drawer assembly comprising:
   a drawer residing beneath the bed;
   a housing mounted to the frame members so as to reside between and below the frame members and beneath the bed;
   the bumper pivoting about a horizontal axis along a bottom edge of the bumper between opened and closed positions; and
   the drawer being longitudinally movable from a rearwardly open position when the bumper is opened wherein the drawer is spaced behind the bed and a forwardly closed position wherein the drawer is inside the housing so that the bumper can be closed.

8. The drawer assembly of claim 7 further comprising plates on the sides of the housing for mounting the housing to the frame members.

9. The drawer assembly of claim 7 wherein drawer is mounted to tracks on opposite sides of the housing.

10. The drawer assembly of claim 7 wherein the drawer is slidably mounted to the housing.

11. The drawer assembly of claim 7 wherein the drawer is rollably mounted to the housing.

12. The drawer assembly of claim 7 further comprising a tire support on a portion of the housing to hold a spare tire beneath the housing.

13. The drawer assembly of claim 7 wherein the drawer and housing form an enclosure for objects in the drawer.

14. In combination, a pickup truck bed mounted to longitudinally extending frame members, a pickup truck rear bumper, a hitch receiver below the bumper, and a drawer assembly, the combination comprising:
   a drawer housing mounted to the frame members;
   a drawer slidably mounted in the housing for movement between a forward closed position and a rearward open position;
   the rear bumper being mounted rearwardly of the drawer and having a central portion pivotally mounted for movement about a horizontal axis at a lower-most edge of the rear bumper, the lower-most edge being above the hitch receiver, between a first raised position when the drawer is in the closed position and a second lowered position when the drawer is in the open position; and
   the drawer being longitudinally movable from a rearwardly open position wherein the drawer is spaced behind the bed and a forwardly closed position wherein the drawer is inside the housing.

15. The drawer assembly of claim 14 further comprising a tire support on a portion of the housing to hold a spare tire beneath the housing.

16. The combination of claim 14 wherein the rear bumper and drawer move independently of one another between their positions.

17. The drawer assembly of claim 8 wherein each plate has a vertical portion residing adjacent to a side of the housing and a horizontal portion connectable to one of the frame members.

18. The combination of claim 14 wherein the drawer housing extends lower than the frame members.

\* \* \* \* \*